Sept. 16, 1969                C. W. HERBERT                3,467,050
                            STERN GEAR FOR SHIPS
Filed Feb. 21, 1967                                      2 Sheets-Sheet 2

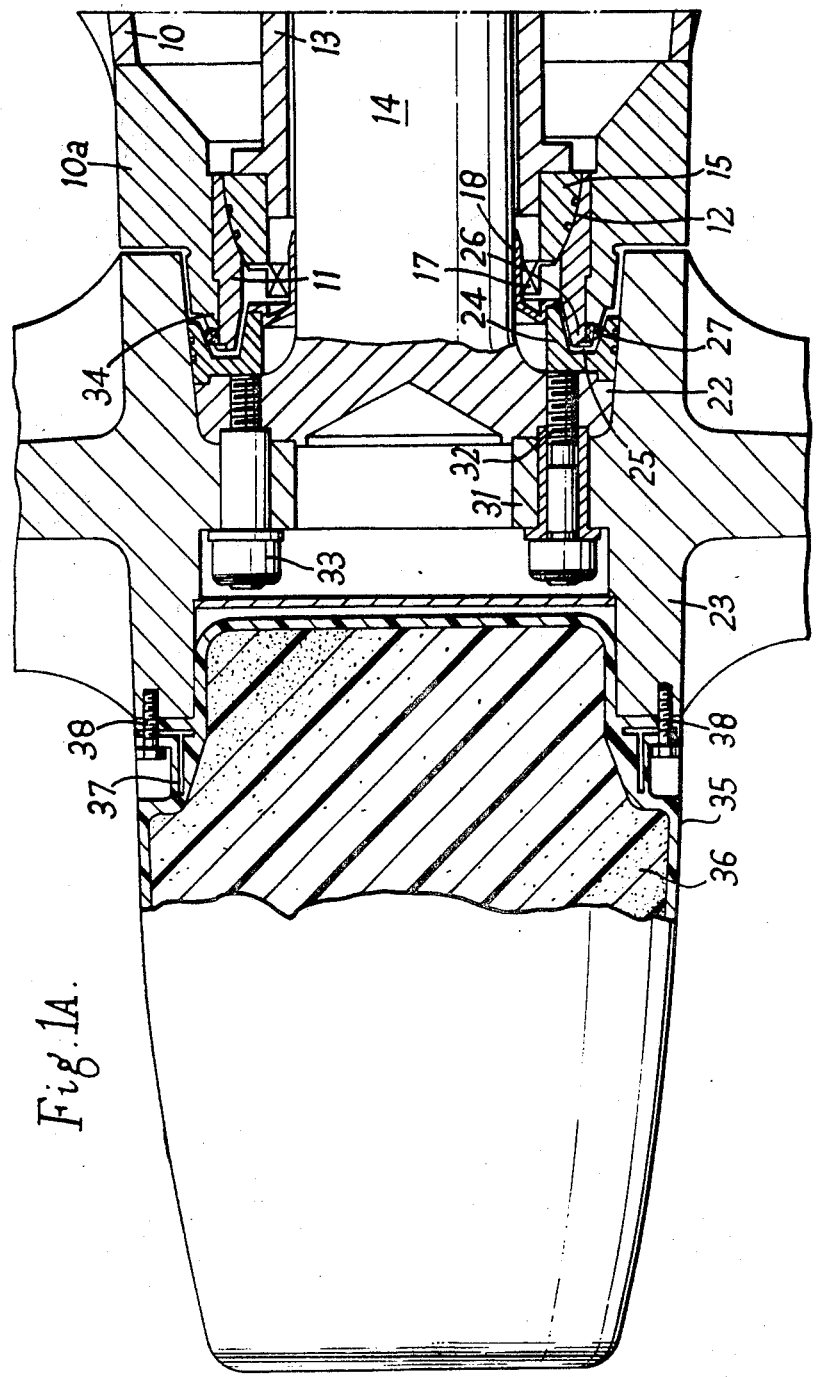

United States Patent Office 3,467,050
Patented Sept. 16, 1969

3,467,050
STERN GEAR FOR SHIPS
Colin Wray Herbert, Marske-by-the-Sea, England, assignor to The Glacier Metal Company Limited, Wembley, Middlesex, England
Filed Feb. 21, 1967, Ser. No. 617,689
Claims priority, application Great Britain, Feb. 22, 1966, 7,827/66
Int. Cl. B63h *23/32;* F16c *33/72;* F16j *15/40*
U.S. Cl. 115—34                                    12 Claims

ABSTRACT OF THE DISCLOSURE

Stern gear for ships wherein a propeller shaft rotates within a stern bearing which is mounted in a stern frame tube wherein the stern bearing is secured axially at its inboard end only and removable inwardly enabling inspection, dismantling, or replacement of the bearing and access to the interior of the frame tube and including support means for the propeller shaft to support the shaft from the stern frame tube when the stern bearing is removed.

---

The present invention relates to stern gear for ships.

A common conventional stern gear has a stern bush which is pressed into the stern frame from inside the vessel and secured by an external nut. The stern bush contains two axially separated inner sleeves with lined bearing surfaces within which the propeller shaft runs. Lubricating oil is retained within the bearing by oil glands at the inner and outer ends of the stern bush. The oil glands are in the form of rotary seals, the outboard gland serving to exclude seawater and sand. The propeller is mounted on the end of the shaft which projects beyond the outboard oil gland. The propeller shaft must be examined at regular intervals and with conventional stern gear this requires docking of the vessel so that the propeller shaft can be removed for inspection, the propeller and outboard oil gland having to be removed first.

In accordance with the present invention there is provided stern gear for ships comprising a stern frame tube, a stern bearing within which the propeller shaft rotates and which is mounted within and spaced from the frame tube, the stern bearing being secured axially at its inboard end only and removable inwardly, enabling inspection, dismantling or replacement of the bearing and access to the interior of the frame tube, an outboard rotary seal between the propeller shaft and the stern frame tube, and support means for the propeller shaft outboard of the stern bearing to support the shaft from the stern frame tube when the stern bearing is removed.

With this construction of the stern gear, inspection and routine maintenance can be carried out without the necessity of removing the shaft or docking the vessel.

The support means may be in the form of a bearing ring fitted at the outboard end of the frame tube. The bearing ring may be supplemented by a hydraulic jacking system mounted within the bearing ring. In an alternative construction the propeller shaft can be drawn forward a short distance to bring it into at least partial engagement with the bearing ring, which is conically tapered to centre the shaft. The drawing forward of the shaft also serves to engage a fixed auxiliary seal outboard of the rotary seal, enabling the rotary seal to be dismantled when the stern bearing is withdrawn complete with the static part of the rotary seal without the necessity of docking the vessel. The fixed auxiliary seal may alternatively take the form of an inflatable seal or seals.

The outboard end of the stern bearing is preferably received within a mounting ring having a spherical or conical seating for the end of the bearing. The bearing ring for supporting the shaft may form part of this mounting ring.

Preferably, the propeller boss is a hollow cylinder with an internal flange which is secured to an end flange on the propeller shaft. The internal flange is set back from the forward end of the boss to the extent that the support means for the propeller shaft and possibly also the outboard rotary seal are contained wholly or partly within the boss. A shaft carrier bush can be mounted on the forward face of the propeller shaft flange and may have an annular groove whose inner face or outer face mates with a bearing ring for the support of the shaft during removal of the stern bearing and whose inner or outer face engages a sealing ring forming the fixed auxiliary seal referred to above.

The hollow cylindrical boss with the internal flange reduces the bending moment on the propeller shaft by reducing the overhang of the propeller weight. The bending moments can be further reduced if the boss has at its aft end a buoyancy chamber providing a lifting moment acting in opposition to the weight of the propeller.

The invention will now be described in more detail with the aid of an example illustrated in the accompanying drawings, in which:

FIGS. 1A and 1B are the two parts of a longitudinal section of a form of stern gear in accordance with the invention.

Figure 1B:
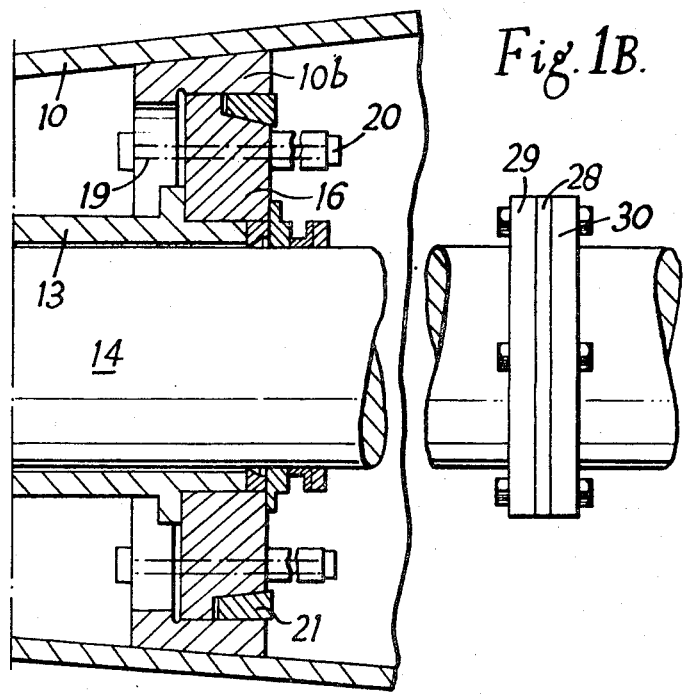

The stern gear shown has a stern frame tube 10 which is constructed as a rigid and continuous tube or cone and which encloses the stern bearing assembly. A mounting ring 11 is pressed into a mechanical housing in a member 10a at the aft end of the frame tube 10. The mounting ring 11 is of corrosion-resistant material and is machined internally to form a spherical seating 12 for the outer end of a stern bush 13 within which a propeller shaft 14 rotates. The stern bearing 13 is a rigid tube of cast iron or steel carrying a seating ring 15 at its aft end which mates with the seating 12. At its forward end it carries a cylindrical flange 16. The bush 13 is lined with anti-friction material which forms the bearing in which the shaft 14 rotates. It may, alternatively, contain a roller contact bearing assembly.

The stationary parts of an outboard rotary seal or oil gland 17 are attached to the seating ring 15 and engage a gland liner 18 attached to and rotating with the shaft 14. A conventional oil gland is fitted at the inboard end of the stern bearing 13. The stern bush is held in position by bolts 19 securing the flange 16 to a stern frame member 10b. The bolts 19 are axially loaded by hydraulically-tightened nuts 20. Arcuate wedges 21 are positioned and secured to ensure positive radial location of the flange 16 against the frame member 10b.

The use of spherical seating 12 for the aft end of the bearing 13 and mounting ring 15 allows adidtional provision to be made for bearing alignment that is not available with the conventional arrangement. Fine adjustment of the horizontal or vertical alignment of the bearing 13 relative to the shaft 14 can be made by adjusting the individual fore and aft positions, of the arcuate wedges 21. If a large angular offset from the optical centre line is required this can be machined into the flange 16 during manufacture.

The propeller shaft 14 is provided with a flanged coupling 22 at its aft end to which a propeller boss 23 is attached whilst a shaft carrier bush 24 is bolted to the forward side of this flange. The bush 24 is of corrosion-resistant material and together with the gland liner 18, forms a protective sleeve for the flange 22 and shaft 14.

The bush 24 also serves as a mounting ring for the gland liner 18.

The bush 24 has a groove 25 in its forward face. The inner wall of the groove 25 forms a frusto-conical surface which rotates within a frusto-conical bearing ring 26 at the aft end of the mounting ring 11. A sealing ring 27 carried in the outside of the bearing ring 26 can engage the outer wall of the groove 25 when the propeller shaft 14 is displaced forwards and at the same time the inner wall of the groove will come into engagement with the bearing ring 26 (although corrosion and the build up of marine deposits may initially prevent complete engagement) so that the shaft is supported by the bearing ring. To enable the propeller shaft to be moved forward a spacer disc 28 is placed between a pair of flange connections 29 and 30 in the shaft line so that upon removal of the disc 28 the flange connections 29 and 30 can be directly coupled and the shaft 14 drawn forward. Alternatively, thrust pads (not shown) can be removed from the main thrust bearing thus allowing the shaft to be pulled forward.

The propeller boss 23 is a hollow cylinder with an internal flange 31 which permits attachment to the shaft flange 22 by studs 32 and nuts. The studs 32 are loaded by hydraulically-tightened nuts 33.

The shaft carrier bush 24 is provided with O-rings in its periphery to prevent ingress of sea water to the steel shaft. The periphery of the bush 24 and that of the shaft flange 22 may be tapered as shown to facilitate mounting of the propeller.

A principal objective of the arrangement is to permit full examination of the stern-gear without removing the propeller or disturbing the shafting. In high power installations therefore the frame tube 10 is made of such diameter that when the bearing assembly is withdrawn a man may enter the annular space surrounding the shaft 14 to examine the surface of the shaft and the outboard gland liner 18. With the shaft diameters of 600 mm. or more this does not involve any penal increase in boss diameter.

Diameters are such that if necessary the gland liner 18 may be withdrawn forward after removal of its securing bolts and the insertion of breaking screws which is accomplished with the aid of an extended ratchet brace. This bush would not normally be expected to require removal during the life of the vessel unless the vessel habitually trades for prolonged periods in waters containing abrasive media.

To remove the bearing and the aft oil gland with the ship afloat in the normal attitude the shaft is first drawn forward as described above or the inflatable seal or seals are operated. The correct functioning of the auxiliary seal 27 is then checked by opening a test connection which drains the water-filled space between the main seal 17 and the auxiliary seal 27. The arcuate wedges 21 are first removed with the aid of breaking screws. The nuts 20 which retain the bearing in position are then removed.

Extraction jacks are then fitted and coupled in parallel to a single hand pump. A standard jack is then placed beneath the shaft 14 forward of the bearing and loaded until it supports the shaft. Then by operation of the hand pump the bearing assembly is jacked forward until the forward flange 16 is clear of its housing within the frame tube 10.

If it is required to remove the bearing when the ship is dry-docked it is unnecessary to carry out the preliminary operation of drawing the shaft forward or operating the inflatable seals. This being the case during the withdrawal process described above the aft end of the shaft assembly will be lowered some 3 mm. until supported by the shaft carrier bearing ring 26.

Next the jack supporting the shaft at its forward end is removed and the bearing assembly complete with the aft oil gland 17 hauled forward on to a suitable carrier on which it may be rotated for inspection.

With the ship in dry dock as a supplement to or as replacement to the support provided by the bearing ring 26 it is possible to provide bolts or a built-in hydraulic jacking system (see FIG. 2) for centering the forward part of the cylindrical propeller boss 23 with respect to the part 34. It will then be necessary for these to be brought into use from outside the vessel before the stern bearing 13 can be moved.

The stern bearing 13 may be provided with plugged holes for measurement of wear-down and, if this is suspected, then the gland assembly and seating ring 15 can be removed from the bearing 14 to facilitate inspection of the most highly-loaded section of the bearing surface.

For inspection or maintenance purposes the flange 16 may be removed from the bearing 13 and the two halves of the bearing separated. The bearing halves may then be removed for rescraping or relining or may be replaced by a spare. To do this it is unnecessary to break the shaft line.

For shaft inspection purposes a semi-circular plastic cover with flanges to support the inspector's feet may be placed over the exposed shaft which may then be rotated slowly using the engine turning gear. Alternatively, the inspection may be completed by re-entering the annular space from beneath the shaft. It is further envisaged that provision be made for the mounting of special honing equipment to permit lapping of the shaft in situ.

The gland liner 18 may be removed as described above; this gives access to the surface of the highly stressed radius between the shaft 14 and flange 22. Thus with the gland liner 18 removed the radius may be visually inspected, with the aid of a viewing instrument if necessary or a dye penetrant check for cracks may be carried out.

Mounted on the aft end of the propeller boss 23 is a buoyancy chamber consisting of a closed hollow shell 35 of synthetic plastic reinforced with glass fibre, the shell 35 being filled with a body 36 of foamed rubber or synthetic material having a closed cell structure. The shell 35 has metal plates 37 embedded in it and is secured by bolts 38 to the aft end of the propeller boss 23. The buoyancy chamber applies a lifting moment which helps to counter the weight of the propeller and thereby reduces the bending moment on the shaft 14. The shell 35 is of approximately frusto-conical form continuing the line of the slightly-tapering propeller boss.

Figure 2:
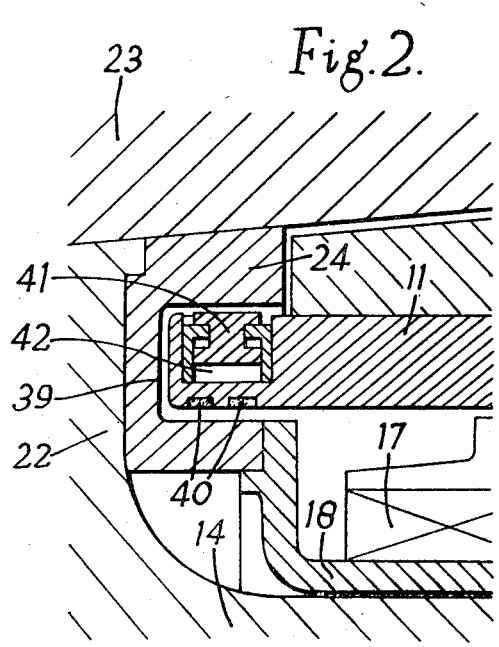
FIG. 2 is a detail in longitudinal section of a modification incorporating a hydraulic jacking system for supporting the propeller shaft during inspection of the stern bearing.

In the modification shown in FIG. 2 the shaft carrier bush 24 has an annular groove 39 in its forward face which accommodates the aft end of the mounting ring 11. The ring 11 has on its inner face inflatable seals 40 to engage the inner wall of the groove 39 and thereby form the auxiliary outboard seal. A number of peripherally-spaced pistons 41 are mounted in the outer face of the ring 11 to form an internal hydraulic jacking system and by supply of hydraulic fluid to their cylinders 42 can be driven outwards to engage the outer wall of the groove 39 and thereby support the shaft 14.

I claim:

1. Stern gear for ships comprising a stern frame tube, a stern bearing within which the propeller shaft rotates and which is mounted within and spaced from the frame tube, the stern bearing being secured at its axially inboard end only and removable inwardly enabling inspection, dismantly or replacement of the bearing and access to the interior of the frame tube, an outboard rotary seal between the propeller shaft and the stern frame tube, an auxiliary sealing ring outboard of the said rotary seal arranged to form a stationary seal between the stern frame tube and the propeller shaft, and support means for the propeller shaft outboard of the stern bearing to support the shaft from the stern frame tube when the stern bearing is removed.

2. Stern gear as claimed in claim 1, in which the support means comprise a bearing ring fitted at the outboard end of the frame tube.

3. Stern gear as claimed in claim 2 also comprising an internal hydraulic jacking system in association with the bearing ring.

4. Stern gear as claimed in claim 2, wherein the shaft includes a removable spacer disc whereby the shaft may be drawn forward into substantial engagement with the bearing ring.

5. Stern gear as claimed in claim 4, in which the bearing ring and the mating part of the shaft are conically tapered.

6. Stern gear as claimed in claim 1, in which the auxiliary sealing ring is an inflatable seal.

7. Stern gear as claimed in claim 5, wherein the propeller shaft has a radial flange with a shaft carrier bush mounted on the forward face of the flange, the shaft carrier bush having an annular groove of which the inner or outer wall is adapted to mate with the bearing ring and the outer or inner wall is arranged to engage the auxiliary sealing ring.

8. Stern gear as claimed in claim 1, wherein the outboard end of the stern bearing is received within a mounting ring having a seating for the end of the stern bearing, said seating having a form of a surface of revolution.

9. Stern gear as claimed in claim 1 in which the inboard end of the bearing is located by a plurality of arcuate wedges.

10. Stern gear as claimed in claim 1, in which the propeller shaft has a radial flange to which is bolted an internal flange of a hollow cylindrical propeller boss.

11. Stern gear as claimed in claim 10, in which the cylindrical wall of the boss extends forwardly of the shaft flange and surrounds a projecting part of the stern frame.

12. Stern gear as claimed in claim 1, including a buoyancy chamber mounted on the aft end of the propeller boss to provide a lifting moment acting in opposition to the weight of the propeller.

References Cited

UNITED STATES PATENTS 794,932  7/1905  Fullerton.

FOREIGN PATENTS 806,386  12/1958  Great Britain.
1,009,254  11/1965  Great Britain.

TRYGVE M. BLIX, Primary Examiner

U.S. Cl. X.R.

170—173; 308—36.3